United States Patent [19]

Ayres et al.

[11] 4,455,352
[45] Jun. 19, 1984

[54] MATERIALS SYSTEM FOR HIGH STRENGTH CORROSION RESISTANT BIMETALLIC PRODUCTS

[75] Inventors: Paul S. Ayres, Alliance; Thomas L. Davis, Louisville, both of Ohio

[73] Assignee: The Babcock & Wilcox Company, New Orleans, La.

[21] Appl. No.: 440,119

[22] Filed: Nov. 8, 1982

[51] Int. Cl.$^3$ .......................... C23C 5/00; C21D 8/00
[52] U.S. Cl. ............................... 428/485; 148/11.5 Q; 148/127; 228/231; 228/235; 228/243
[58] Field of Search ................ 148/11.5 Q, 12 E, 127, 148/12.3, 142, 12 R; 228/235, 231, 243, 263.15; 428/685

[56] References Cited

U.S. PATENT DOCUMENTS

| | | | |
|---|---|---|---|
| 3,489,618 | 1/1970 | Holtzman | 148/12 R |
| 3,692,514 | 9/1972 | Hydrean | 75/125 |
| 3,696,499 | 10/1972 | Dromsky | 148/127 |
| 3,884,731 | 5/1975 | Barkman et al. | 428/685 |
| 3,944,396 | 3/1976 | Chivinsky | 428/685 |
| 4,159,918 | 7/1979 | von Bogandy et al. | 148/12 R |
| 4,162,758 | 7/1979 | Mikarai | 228/131 |
| 4,178,417 | 12/1979 | Oda et al. | 148/127 |

FOREIGN PATENT DOCUMENTS

| | | | |
|---|---|---|---|
| 54-28255 | 3/1979 | Japan | 228/263.15 |
| 341849 | 6/1972 | U.S.S.R. | 148/127 |

OTHER PUBLICATIONS

Ulam, "Composite Tubing and Piping", Allegheny Ludlum Steel Corporation, Pittsburgh, Pa., 1961, 8 pp.
"Composite Tubes for Recovery Boilers", Sandvik Steel Catalogue, May 1977, 5 pp.

*Primary Examiner*—Peter K. Skiff
*Attorney, Agent, or Firm*—Robert J. Edwards; Mark B. Quatt

[57] ABSTRACT

A specific material system for bimetallic products is produced by diffusion bonding an age-hardenable low alloy steel with austenitic stainless steel at an elevated temperature, followed by a two step austenitizing and aging process. The resulting material combination is characterized by desirably metallurgical and structural properties in the low alloy steel component and by high corrosion resistance in the stainless steel component with virtual elimination of detrimental carbon migration across the diffusion bond from the low alloy steel to the austenitic steel.

14 Claims, No Drawings

MATERIALS SYSTEM FOR HIGH STRENGTH CORROSION RESISTANT BIMETALLIC PRODUCTS

BACKGROUND

1. Field of the Invention

The present invention is related to a materials system wherein a bimetallic product is produced by diffusion bonding a low alloy steel with austenitic stainless steel. More particularly, the invention relates to such a materials system produced by diffusion bonding at an elevated temperature, followed by austenitizing, cooling, and aging of the resulting combination to produce a composite material with desirable metallurgical and mechanical properties, and the virtual elimination of carbon transport across the diffusion bond.

2. Description of the Prior Art

Bimetallic products, especially bimetallic tubing, have been used to take advantage of the specific properties of more than one material in a single product. In such products, a material with one desirable property is bonded to another material with a different property. U.S. Pat. No. 3,566,741 (Sliny) shows a tubular, seamless, dual hardness armor plate utilizing a metallurgical bond between a ductile inner shell and an impact resistant outer shell. The resulting advantage is superior impact resistance to projectiles, drilling tools, etc. U.S. Pat. No. 3,693,242 (Chivinsky) shows the use of carbon steel and stainless steel as components of a composite material in which heat conducting qualities of the carbon steel are combined with a stain resistant quality of the stainless steel. U.S. Pat. No. 3,696,499 (Dromsky) discloses an arrangement in which a layer of stainless steel is sandwiched between and metallurgically bonded to two layers of low carbon steel. The resulting composite tube is suitable for use. e.g. in brake tubing. Inclusion of a stainless steel layer provides improved corrosion resistance.

One combination of materials involves the use of austenitic stainless steel with a low alloy steel to produce a bimetallic tube. Typically, a thin layer of stainless steel provides the corrosion resistance; the low alloy steel provides high strength at low cost. Unfortunately, metallurgical problems arise in the production of such a product.

First, because of the large difference in carbon activities between the two materials, during all hot working and heat treating operations carbon will tend to diffuse from the low alloy steel to the austenitic stainless steel. This results in a reduction in the desired properties of both materials. Because carbon is usually a very important factor in determining the hardenability of the low alloy steel, the loss of carbon by this phenomenon can lead to reduced strength in this material. The corresponding increase in carbon content in the stainless steel results in chromium carbide formation at grain boundaries during cooling with attendant reduction of chromium at those boundaries and thus reduced corrosion resistance. This problem becomes especially severe in the case of an optimally designed bimetallic product where only a very thin layer of stainless steel is used; here the entire layer can become carburized, rendering the product unfit for its intended service.

One solution is the use of a properly selected interface material, for example nickel which when positioned between the low alloy steel and the stainless steel will limit the problem by presenting a barrier to carbon diffusion. However, this approach significantly increases the cost and complexity of the bimetallic product and makes other fabrication operations with the bimetallic product such as welding, more difficult.

A second problem arises from the fact that the austenitic stainless steel/low alloy steel combination is generally not compatible in heat treatment. For optimum corrosion resistance the austenitic stainless steel requires a solution anneal in which it is heated to at least 1850° F. and water quenched. After such a treatment it is very important that this material not be heated for extended periods in the temperature regime of 950° F. to 1500° F. in order to prevent "sensitization", i.e., chromium carbide formation at grain boundaries with attendant loss of corrosion resistance. The low alloy steel requires a quench and tempering treatment in which the material is heated to about 1650° F., water quenched, and tempered at between 1100° and 1200° F. for one or more hours in order to provide optimum mechanical properties. The tempering portion of the cycle imparts good fracture toughness to the low alloy steel; however this same treatment tends to cause "sensitization" of the austenitic stainless steel and loss of corrosion resistance. Since the sensitization phenomenon increases in severity with increasing time and/or temperature, the choice of a low temperature and/or a very short tempering time should offer some relief from this problem. However, short times and low temperatures in general result in poor fracture toughness for the low alloy steel. Since increasing carbon content tends to accelerate the onset and the severity of the sensitization phenomenon in the austenitic stainless steel, use of low carbon, "L grade", stainless steel (e.g. 304L with a maximum of 0.035% carbon) appears to afford some relief. However, the lower carbon content of the austenitic stainless steel will only accentuate the carbon activity gradient relative to the low alloy steel (with a typical carbon content of about 0.40%) and worsen the carbon diffusion problem cited above. In the past, an appropriate heat treatment was selected to provide optimum properties for one material, while tolerating minimal but not totally degraded properties in the companion material. Alternatively, the combination was treated such that only moderate properties would be achieved in both materials.

SUMMARY OF THE INVENTION

The present invention provides a specific material combination for bimetallic products, especially tubing. A bimetallic product is produced by diffusion bonding an age-hardenable low alloy steel with an austenitic stainless steel at a temperature of between 1700° F. and 2300° F.; heating the resulting combination to about 1650° F. for at least fifteen minutes; water quenching or air cooling the heated material; aging the quenched or air cooled material at between 900° F. and 1100° F. for a maximum of one hour; and air cooling the aged material. Such a treatment causes the austenitic stainless steel to be in a stress relieved state and in a solution annealed microstructural state. The low alloy steel will develop yield and tensile strengths of up to 90,000 and 100,000, respectively, with very good fracture toughness. Additionally, since both materials have very low and nearly equal carbon activities, the problem of carbon transport during heating for hot working and final heat treatment will be virtually eliminated. Thus, this material system results in the development of highly desirable mechanical properties as well as excellent resistance to intergranular corrosion and stress corrosion cracking in severe environments at temperatures up to about 500° F.

DESCRIPTION OF THE PREFERRED EMBODIMENT

In a preferred embodiment of the invention, an age-hardenable low alloy steel, such as IN-787 manufactured by International Nickel Company, is combined with an austenitic stainless steel, for example 304L or 316L stainless steel. Similar 300 series austenitic stainless steels may also be used in the invention. The combination is initially heated to create a diffusion bond between the two components either with or without hot working operations as known in the art, such as rolling or extrusion. The preferred temperature range for bonding and/or hot working is 1700° F. to about 2300° F.

After bonding, the resulting material combination is subjected to a two step heat treatment to produce desired mechanical and metallurgical properties in the final product.

The first or austenitizing step involves heating of the combination to a temperature of about 1650° F. This temperature is maintained for at least fifteen minutes, and typically between about fifteen minutes and one hour for each inch of total product thickness. The austenitized material is then water quenched or air cooled.

The second or aging step involves heating of the austenitized material to a temperature of about 900° F. to 1100° F. This temperature is maintained for a maximum of one hour. The aged material is then air cooled.

In the preferred embodiment of the invention, the age-hardenable low alloy steel comprises a combination of from 0.02% to 0.06% carbon; 0.40% to 0.65% manganese; 0.20% to 0.35% silicon; 0.70% to 1.0% nickel; 1.0% to 1.3% copper; 0.15% to 0.25% molybdenum; at least 0.60% chromium and at least 0.03% columbium; with the remainder substantially all iron.

The austenitic stainless steel preferably comprises in combination, not more than 0.035% carbon; 16.0% to 18.0% chromium; 10.0% to 15.0% nickel; 2.0% to 3.0% molybdenum; not more than 2.0% manganese; not more that 1.0% silicon; with the remainder substantially all iron.

In another preferred embodiment of the invention the austenitic stainless steel comprises in combination, not more that 0.035% carbon; 18.0% to 20.0% chromium; 8.0% to 13.0% nickel; not more than 2.0% manganese; not more than 1.0% silicon; and the remainder substantially all iron.

The preferred percentage of carbon in the low alloy steel component of this material combination would be determined by the end use considering other desired properties relevant to the particular application, such as yield strength and fracture toughness. The particular process routine selected can be made without reducing the corrosion resistance of the austenitic stainless steel. Normalization may be used in lieu of a water quenching step; in some cases the austenitizing step may be omitted, and the aging step may be applied directly to the material combination after the initial heating or bonding step. In cases where the material combination is applied as a tube requiring coldbending into a U-shape or other configuration, it may be desirable to perform the final aging heat treatment after bending of the product.

A typical application of the present invention would be to composite tubes with an inside diameter of the tube being stainless steel and the outside diameter of the tube wall being age-hardenable low alloy steel. Of course, these could be reversed, or the inside and outside surfaces could be stainless steel with a mid wall of the age-hardenable low alloy steel sandwiched therebetween.

While in accordance with the provisions of the statues, there is illustrated and described herein a specific embodiment of the invention, those skilled in the art will understand that changes may be made in the form of the invention covered by the claims and that certain features of the invention may be used to advantage without the corresponding use of the other features.

The embodiments of the invention in which an exclusive property or privilege is claimed are defined as follows:

1. A specific materials system for bimetallic products suitable for low-temperature service up to about 500° F., having a yield strength of about 90,000 psi produced by:
   (a) diffusion bonding an age-hardenable low alloy steel, to an austenitic stainless steel at a temperature of between 1700° F. and 2300° F.;
   (b) heating the resulting composite to about 1650° F. for at least fifteen minutes;
   (c) water quenching the heated material;
   (d) aging the quenched material at between about 900° F. and 1100° F. for a maximum of one hour; and
   (e) air cooling the aged material.

2. A specific materials system for bimetallic products suitable for low-temperature service up to about 500° F., having a yield strength of about 90,000 psi produced by:
   (a) diffusion bonding an age-hardenable low alloy steel to an austenitic stainless steel at a temperature of between 1700° F. and 2300° F.;
   (b) heating the resulting composite to about 1650° F. for at least fifteen minutes;
   (c) air cooling the heated material;
   (d) aging the aircooled material at between about 900° F. and 1100° F. for a maximum of one hour; and
   (e) air cooling the aged material.

3. The materials system as in claims 1 or 2 wherein the material system is hot-worked during the initial diffusion bonding step.

4. The materials system as in claims 1 or 2 wherein the age-hardenable low alloy steel comprises in combination, 0.02% to 0.06% carbon; 0.40% to 0.65% manganese; 0.20% to 0.35% silicon; 0.70% to 1.0% nickel; 1.0% to 1.3% copper; 0.15% to 0.25% molybdenum; at least 0.60% chromium; at least 0.03% columbium; and the remainder substantially all iron.

5. The materials system as in claims 1 or 2 wherein the austenitic stainless steel comprises in combination, not more than 0.035% carbon; 16.0% to 18.0% chromium; 10.0% to 15.0% nickel; 2.0% to 3.0% molybdenum; not more than 2.0% manganese, not more than 1.0% silicon; and the remainder substantially all iron.

6. The materials system as in claims 1 or 2 wherein the austenitic stainless steel comprises in combination, not more than 0.035% carbon; 18.0% to 20.0% chromium; 8.0% to 13.0% nickel; not more than 2.0% manganese; not more than 1.0% silicon; and the remainder substantially all iron.

7. The materials system according to claims 1 or 2 wherein the material system is held at the austenitizing temperature for fifteen minutes to one hour for each inch of total product thickness, and at the aging temperature for a maximum of one hour.

8. A method of producing a specific materials system for bimetallic products suitable for low-temperature service up to about 500° F., having a yield strength of about 90,000 psi which comprises:
(a) diffusion bonding an age-hardenable low alloy steel to an austenitic stainless steel at a temperature of between 1700° F. and 2300° F.;
(b) heating the resulting composite to about 1650° F. for at least fifteen minutes;
(c) water quenching the heated material;
(d) aging the quenched material at between 900° F. and 1100° F. for a maximum of one hour; and
(e) air cooling the aged material.

9. A method of producing a specific materials system for bimetallic products suitable for low-temperature service up to about 500° F., having a yield strength of about 90,000 psi which comprises:
(a) diffusion bonding an age-hardenable low alloy steel to an austenitic stainless steel at a temperature of between 1700° F. and 2300° F.;
(b) heating the resulting composite to about 1650° F. for at least fifteen minutes;
(c) air cooling the heated material;
(d) aging the air cooled material at between 900° F. and 1100° F. for a maximum of one hour and
(e) air cooling the aged material.

10. The method as in claims 8 or 9 wherein the material system is hot-worked during the initial diffusion bonding step.

11. The method as in claims 8 or 9 wherein the age-hardenable low alloy steel comprises in combination, 0.02% to 0.06% carbon; 0.40% to 0.65% manganese; 0.20% to 0.35% silicon; 0.70% to 1.0% nickel; 1.0% to 1.3% copper; 0.15% to 0.25% molybdenum; at least 0.60% chromium; at least 0.03% columbium; and the remainder substantially all iron.

12. The method as in claims 8 or 9 wherein the austenitic stainless steel comprises in combination, not more than 0.035% carbon; 16.0% to 18.0% chromium; 10.0% to 15.0% nickel; 2.0% to 3.0% molybdenum; not more than 2.0% manganese; not more than 1.0% silicon; and the remainder substantially all iron.

13. The method as in claims 8 or 9 wherein the austenitic stainless steel comprises in combination, not more than 0.035% carbon; 18.0 to 20.0% chromium; 8.0% to 13.0% nickel; not more than 2.0% manganese; not more than 1.0% silicon; and the remainder substantially all iron.

14. The method as in claims 8 or 9 wherein the material system is held at the austenitizing temperature for fifteen minutes to one hour for each inch of total product thickness, and at the aging temperature for a maximum of one hour.

* * * * *